United States Patent
Paulzagade et al.

(10) Patent No.: US 12,032,449 B2
(45) Date of Patent: Jul. 9, 2024

(54) SYSTEM AND METHOD FOR DATA DEDUPLICATION USING A BACKUP DATA BLOCK

(71) Applicant: Druva Inc., Sunnyvale, CA (US)

(72) Inventors: Sudhakar Paulzagade, Pune (IN); Santosh Nanaji Patil, Pune (IN)

(73) Assignee: Druva Inc., Santa Clara, CA (US)

( * ) Notice: Subject to any disclaimer, the term of this patent is extended or adjusted under 35 U.S.C. 154(b) by 175 days.

(21) Appl. No.: 17/361,035

(22) Filed: Jun. 28, 2021

(65) Prior Publication Data
US 2022/0283905 A1 Sep. 8, 2022

(30) Foreign Application Priority Data
Mar. 2, 2021 (IN) .............................. 202141008785

(51) Int. Cl.
*G06F 11/14* (2006.01)
*G06F 16/215* (2019.01)

(52) U.S. Cl.
CPC ...... *G06F 11/1453* (2013.01); *G06F 11/1469* (2013.01); *G06F 16/215* (2019.01); *G06F 2201/84* (2013.01)

(58) Field of Classification Search
CPC .... G06F 11/14; G06F 16/215; G06F 2201/84; G06F 2201/80
See application file for complete search history.

(56) References Cited

U.S. PATENT DOCUMENTS

| | | | |
|---|---|---|---|
| 9,081,792 B1* | 7/2015 | Williams | G06F 3/0619 |
| 9,424,265 B1* | 8/2016 | Sui | G06F 16/284 |
| 10,445,292 B1* | 10/2019 | Zhang | G06F 16/1748 |
| 10,592,149 B1* | 3/2020 | Jenkins | G06F 16/1752 |
| 10,769,103 B1* | 9/2020 | Patwardhan | G06F 16/128 |
| 2005/0135806 A1* | 6/2005 | Mishra | H04L 12/5601 398/45 |
| 2016/0041777 A1* | 2/2016 | Tripathy | G06F 16/1752 711/126 |
| 2016/0306560 A1* | 10/2016 | Maranna | G06F 16/1748 |

* cited by examiner

*Primary Examiner* — Maher N Algibhah
(74) *Attorney, Agent, or Firm* — IceMiller LLP

(57) ABSTRACT

A system and a method for client-side deduplication system for a plurality of backup streams, generated by a backup and recovery client from a client database, is presented. The system includes a stream handler configured to generate a unique file name for an underlying file of each backup stream of the plurality of backup streams based on one or more data blocks in each backup stream. The system further includes a file creator configured to create a data file corresponding to each backup stream of the plurality of backup streams in a local cache of a client database server, wherein each data file has a file name corresponding to the unique file name generated by the stream handler. The client-system furthermore includes a dedupe module configured to dedupe subsequent backup streams based on the data files in the local cache.

14 Claims, 5 Drawing Sheets

SYSTEM AND METHOD FOR DATA DEDUPLICATION USING A BACKUP DATA BLOCK

CROSS REFERENCE TO RELATED APPLICATION

This application claims a benefit of, and priority to, Indian Provisional Patent Application No. 202141008785, filed Mar. 2, 2021, the contents of which is incorporated by reference in its entirety.

BACKGROUND

Embodiments of the present invention generally relate to systems and methods for client-side data deduplication using a backup data block, and more particularly to systems and methods for client-side data deduplication in an Oracle database using a backup data block.

Oracle Database (commonly referred to as Oracle DBMS or simply as Oracle) is a multi-model database management system. Recovery Manager (RMAN) is an Oracle Database client that performs backup and recovery tasks on the Oracle databases and automates the administration of the backup strategies. Oracle RMAN is the de facto tool of choice for Oracle database backup that employ backup streams.

RMAN creates backup files with unique names for every backup stream. However, RMAN does not provide any metadata about which Oracle datafile is inside the given backup stream This is done by RMAN to uniquely identify backup in its catalog. Thus, each stream file appears as a new file to the backup application thereby reducing deduplication capability, resulting in higher prob calls and higher cogs.

Thus, there is a need for systems and methods that enable client-side deduplication of files in an Oracle database.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a client-side deduplication system for a plurality of backup streams, generated by a backup and recovery client from a client database, is presented. The client-side deduplication system includes a stream handler configured to generate a unique file name for an underlying file of each backup stream of the plurality of backup streams based on one or more data blocks in each backup stream. The client-side deduplication system further includes a file creator configured to create a data file corresponding to each backup stream of the plurality of backup streams in a local cache of a client database server, wherein each data file has a file name corresponding to the unique file name generated by the stream handler. The client-side deduplication system furthermore includes a dedupe module configured to dedupe subsequent backup streams based on the data files in the local cache.

Briefly, according to an example embodiment, a system for client-side deduplication system for a plurality of backup streams, generated by a backup and recovery client from a client database, is presented. The client-side deduplication system includes a memory storing one or more processor-executable routines, and a processor communicatively coupled to the memory. The processor is configured to execute the one or more processor-executable routines to generate a unique file name for an underlying file of each backup stream of the plurality of backup streams based on one or more data blocks in each backup stream. The processor is further configured to execute the one or more processor-executable routines to create a data file corresponding to each backup stream of the plurality of backup streams in a local cache of a client database server, wherein each data file has a file name corresponding to the unique file name. The processor is furthermore configured to execute the one or more processor-executable routines to dedupe subsequent backup streams based on the data files in the local cache.

According to another example embodiment, a method for client-side deduplication of a plurality of backup streams, generated by a backup and recovery client from a client database, is presented. The method includes generating a unique file name for an underlying file of each backup stream of the plurality of backup streams based on one or more data blocks in each backup stream. The method further includes creating a data file corresponding to each backup stream of the plurality of backup streams in a local cache of a client database server, wherein each data file has a file name corresponding to the unique file name. The method furthermore includes deduping subsequent backup streams based on the data files in the local cache.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
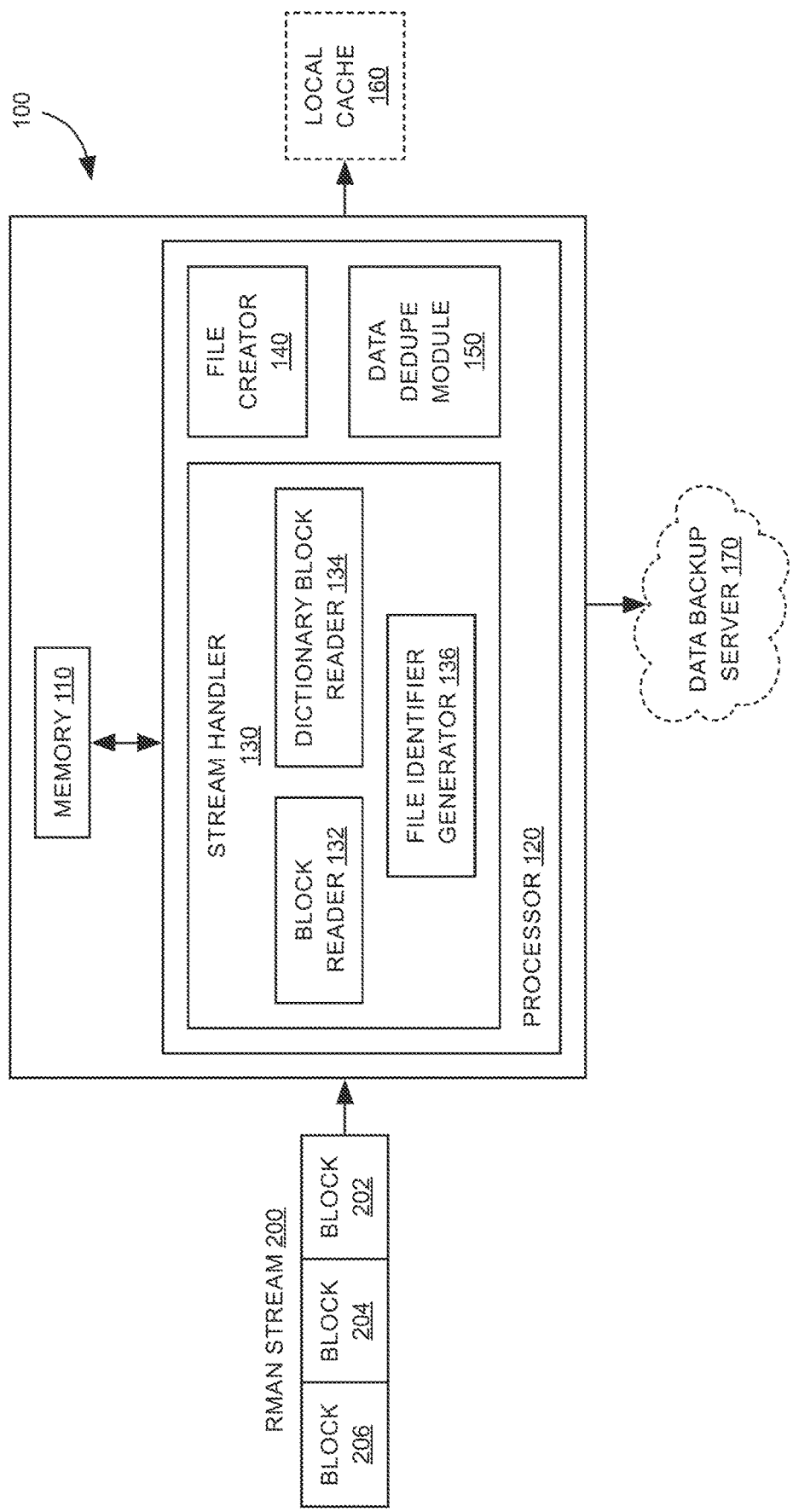
FIG. 1 is a block diagram illustrating an example data deduplication system according to some aspects of the present description.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein. On the contrary, example embodiments are to cover all modifications, equivalents, and alternatives thereof.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Before discussing example embodiments in more detail, it is noted that some example embodiments are described as processes or methods depicted as flowcharts. Although the flowcharts describe the operations as sequential processes, many of the operations may be performed in parallel, concurrently, or simultaneously. In addition, the order of operations may be re-arranged. The processes may be terminated when their operations are completed, but may also have additional steps not included in the figures. It should also be noted that in some alternative implementations, the functions/acts/steps noted may occur out of the order noted in the figures. For example, two figures shown in succession may, in fact, be executed substantially concurrently or may sometimes be executed in the reverse order, depending upon the functionality/acts involved.

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or a section. Thus, a first element, component, region, layer, or section discussed below could be termed a second element, component, region, layer, or section without departing from the scope of example embodiments.

Spatial and functional relationships between elements (for example, between modules) are described using various terms, including "connected," "engaged," "interfaced," and "coupled." Unless explicitly described as being "direct," when a relationship between first and second elements is described in the description below, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless specifically stated otherwise, or as is apparent from the description, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments of the present description provide systems and methods for client-side deduplication of a plurality of backup streams generated by a backup and recovery client from a client database FIG. 1 illustrates an example client-side data deduplication system 100 (hereinafter referred to as "system 100"), in accordance with some embodiments of the present description. The system 100 is configured is to facilitate client-side deduplication for a plurality of backup streams generated by a backup and recovery client from a client database. In some embodiments, a backup stream of the plurality of backup streams includes a data file, an archived log file, a control file, or an sp file.

In some embodiments, the system 100 is configured to facilitate client-side deduplication of data in an Oracle database. Oracle Database (commonly referred to as Oracle DBMS or simply as Oracle) is a multi-model database management system. Recovery Manager (RMAN) is an Oracle Database client that performs backup and recovery tasks on the Oracle databases and automates the administration of the backup strategies. In some embodiments, the system 100 may be associated with a data backup application configured to initiate a backup of data using RMAN.

As noted earlier, RMAN creates backup files with unique names for every backup stream. However, RMAN does not provide any metadata about which Oracle data file is inside the given backup stream. Thus, each stream file appears as a new file to the backup application thereby reducing deduplication capability. Embodiments of the present description address the noted shortcomings in the art by providing data deduplication systems and methods using one or more data blocks in the backup streams.

As shown in FIG. 1, the system 100 includes a memory 110 storing one or more processor-executable routines and a processor 120 communicatively coupled to the memory 110. The processor 120 is configured to execute the processor-executable routines to perform the deduplication method as described herein. The processor 120 includes a stream handler 130, a file creator 140, and a dedupe module 150. Each of these components is described in detail below.

The stream handler 130 is configured to generate a unique file name for an underlying file of each backup stream of the plurality of backup streams based on one or more data blocks in each backup stream. In some embodiments, the stream handler 130 may reside in a serial backup tape (SBT) library on a data backup application.

The stream handler 130 includes a block reader 132, a dictionary block reader 134, and a file name generator 136. The stream handler 130 is configured to generate the unique file name for an underlying file of a backup stream of the plurality of backup streams based on a database name, a database ID, and an inode number corresponding to the backup stream.

The block reader 132 is configured to read a first block of a backup stream to identify a stream block size, database ID, and a number of meta blocks in the backup stream. The dictionary block reader 134 is configured to read one or more subsequent blocks in the backup stream to identify a dictionary block, and further read a file number, a relative file number, and database name from the identified dictionary block. The file name generator 136 is configured to generate the inode number based on the file number and the relative file number, and further generate the unique file name for the underlying file based on the database name, the database ID, and the inode number.

The present technique of generating a unique file name by the stream handler 130 is further illustrated with reference to a backup stream 200 in FIGS. 1-3. As shown in FIG. 1, the system 100 is configured to receive a backup stream 200 (sometimes also referred to as RMAN stream) including a plurality of data blocks 202, 204, and 206. Each block contains a header and footer as shown in the FIGS. 2 and 3.

The first block of a backup stream contains metadata immediately following the Oracle kernel cache block header. The block reader 132 is configured to read the first block and identify the following information from the first block: stream block size, number of files in the backup block, database ID, and number of meta blocks.

Figure 2:
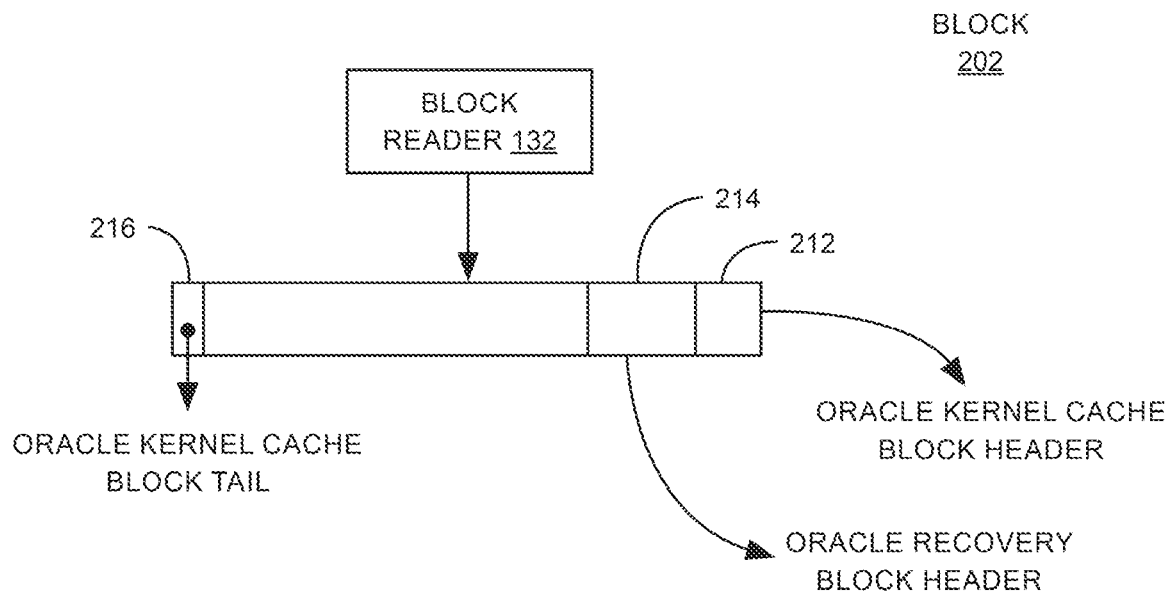
FIG. 2 is a block diagram illustrating an example data stream block, according to some aspects of the present description.
Figure 3:
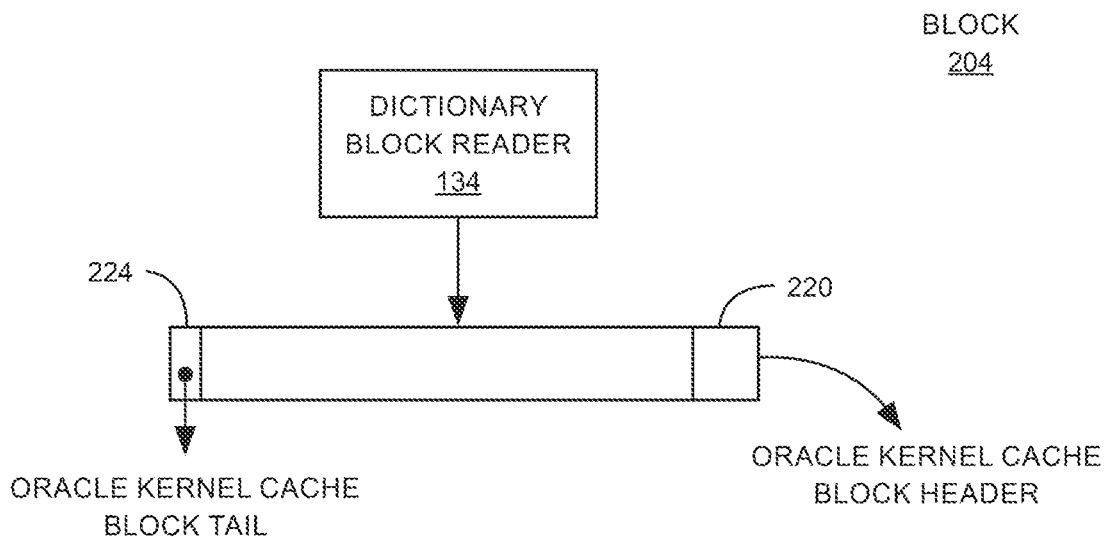
FIG. 3 is a block diagram illustrating an example data stream block, according to some aspects of the present description.

FIG. 2 shows an example first block 202 in the backup stream 200. The block 202 includes an Oracle kernel cache block header 212, an Oracle recovery block header 214, and an Oracle kernel cache block tail 216. In the embodiment illustrated in FIG. 2, the block reader 132 is configured to read the first block and identify the stream block size, number of files in the backup block, database ID, and number of meta blocks from the metadata in the Oracle recovery block header 214 of the first block 202.

In the subsequent blocks such as 204 and 206, the dictionary block reader 134 is configured to look for dictionary or meta blocks. For example, for block 204 shown in FIG. 3, the dictionary block reader 134 is configured to check if the block 204 is a dictionary block by checking the Oracle cache block kernel header 220 of the block 204.

If the block is not a dictionary block, the dictionary block reader 134 is configured to skip it. If the dictionary block reader finds a dictionary block, the dictionary block reader 134 is configured to read the file number (file #) and relative file number (relative file #) for this block. In embodiments related to archived redo logs, the dictionary block reader 134 is configured to read sequence number (sequence #) and thread number (thread #) for this block.

Referring again to FIG. 1, the file name generator 136 is further configured to generate a 64-bit inode number that uniquely identifies the file within the Oracle database using the following formulae:
(1) file #<<32| relative file #or
(2) thread #<<32| sequence #

The file name generator 136 is further configured to generate a unique file name using the database ID, database name, and inode number, as shown below:
<DBName>-<DBID>-<file #<<32| relative file #>
<DBName>-<DBID>-<thread #<<32| sequence #>

The file name generated by the file name generator 136 uniquely identifies the file in the client database and across databases.

With continued reference to FIG. 1, the file creator 130 is configured to create a data file corresponding to each backup stream of the plurality of backup streams in a local cache 160 of a client database server, wherein each data file has a file name corresponding to the unique file name generated by the stream handler 130.

The file creator 130 is further configured to create a reference file corresponding to each backup stream of the plurality of backup streams in the local cache 160 of the client database server, wherein the reference file is an empty file having a file name assigned by the backup and recovery client (e.g., RMAN) to the backup stream. The reference file includes extended metadata containing the unique file name of the data file corresponding to the reference file, wherein the data file contains the real data. Thus, the file creator 140 is configured to create two files per backup stream file after the stream handler 130 identifies the underlying data file/archived redo log/control file/sp file for every backup stream.

In some embodiments, the file creator 140 is further configured to create the reference file and the data file corresponding to each backup stream of the plurality of backup streams on a dedupe storage (not shown in FIGs.) In some embodiments, the file creator 140 is further configured to create the reference file and the data file corresponding to each backup stream of the plurality of backup streams on a backup server 170. The reference and data files may be used for deduplication in case of data loss and/or corruption on the local cache 160 in the client database server.

The system 100, as shown in FIG. 1, further includes a dedupe module 150 configured to dedupe subsequent backup streams based on the data files in the local cache 160. As each data file in the local cache has a unique file name assigned by the stream handler, the dedupe module 150 can perform client-side deduplication of the data files and thus avoid prob calls and cogs on the backup server 170.

Figure 4:
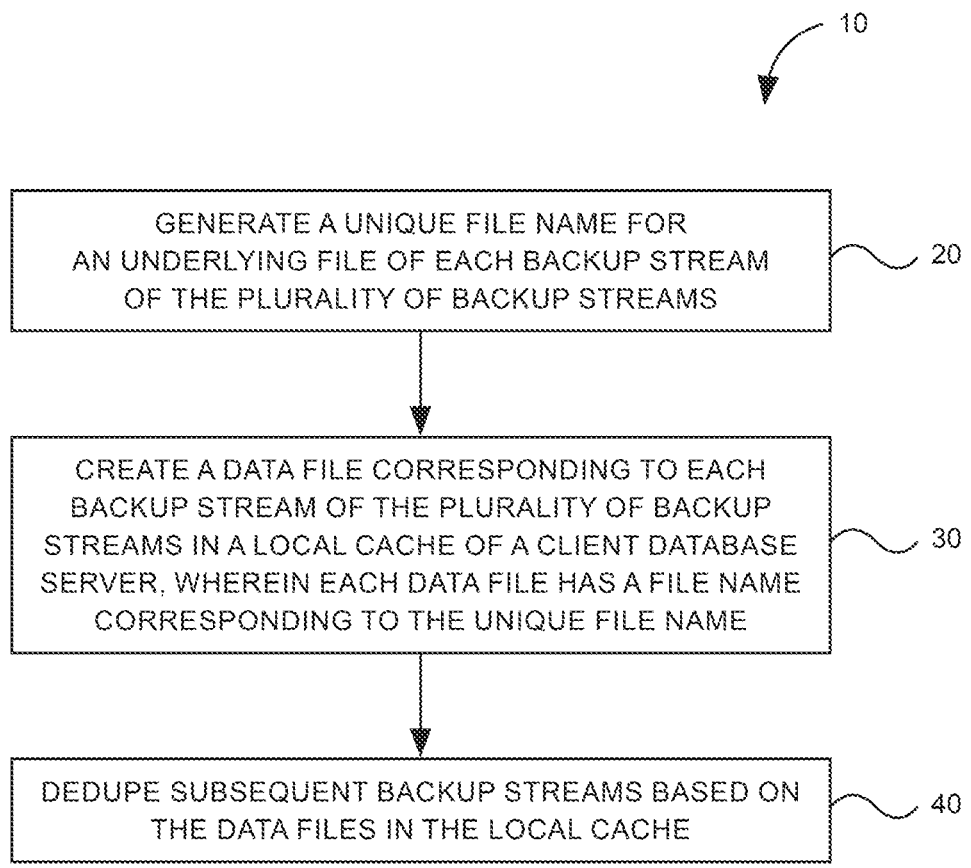
FIG. 4 is a flow chart illustrating an example method for client-side data deduplication, according to some aspects of the present description.

Referring again to FIG. 1, the processor 120 is configured to execute the processor-executable routines to perform the steps illustrated in the flow-chart of FIG. 4. FIG. 4 is a flowchart illustrating a method 10 for client-side deduplication of a plurality of backup streams generated by a backup and recovery client from a client database. The method 10 may be implemented using the data deduplication system 100 of FIG. 1, according to some aspects of the present description. Each step of the method 10 is described in detail below.

The method includes, at block 20, generating a unique file name for an underlying file of each backup stream of the plurality of backup streams based on one or more data blocks in each backup stream. In some embodiments, the method 10 includes, at block 20, generating the unique file name for an underlying file of a backup stream of the plurality of backup streams based on a database name, a database ID, and an inode number corresponding to the backup stream.

Figure 5:
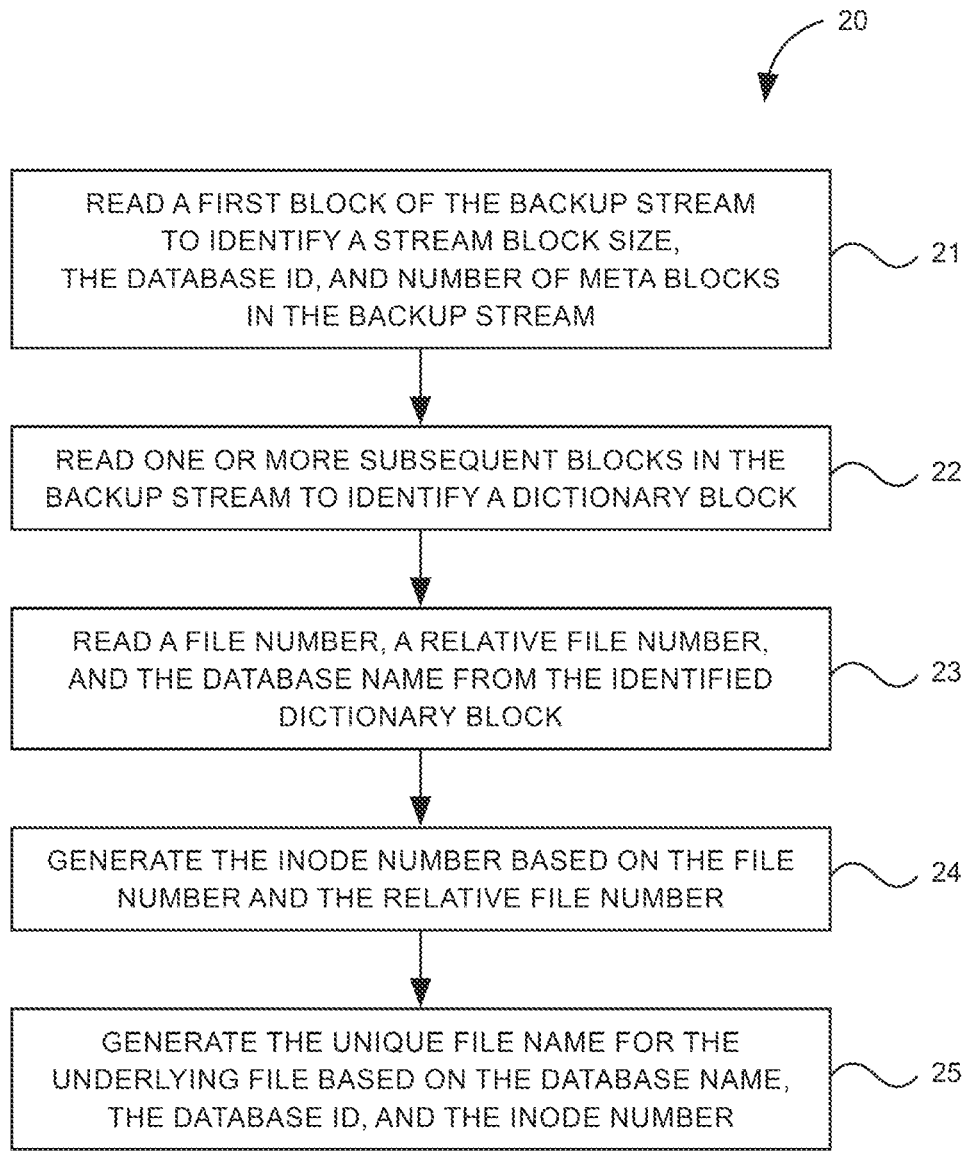
FIG. 5 is a flow chart illustrating an example step in the method of FIG. 4 for generating a unique file name, according to some aspects of the present description.

FIG. 5 further illustrates a flow chart illustrating the steps for generating a unique file name for an underlying file of each backup stream of the plurality of backup streams based on one or more data blocks in each backup stream, As shown in FIG. 5, the step 20 of generating the unique file name includes, at block 21, reading a first block of the backup stream to identify a stream block size, the database ID, and number of meta blocks in the backup stream.

The step 20, further includes, at block 22, reading one or more subsequent blocks in the backup stream to identify a dictionary block. Moreover, the step 20 includes, at block 23, reading a file number, a relative file number, and the database name from the identified dictionary block. The step 20, furthermore includes, at block 24, generating the inode number based on the file number and the relative file number. Moreover, the step 20 includes, at block 25, generating the unique file name for the underlying file based on the database name, the database ID, and the inode number.

Referring again to FIG. 4, the method 20 further includes, at block 30, creating a data file corresponding to each backup stream of the plurality of backup streams in a local cache of a client database server, wherein each data file has a file name corresponding to the unique file name.

The method 20 may furthermore include, at block 30, creating a reference file corresponding to each backup stream of the plurality of backup streams in the local cache of the client database server. The reference file is an empty file having a file name assigned by the backup and recovery client (e.g., RMAN) to the backup stream, and includes extended metadata containing the unique file name of the data file corresponding to the reference file. Thus, at block 30, the method includes creating two files per backup stream file after identifying the underlying data file/archived redo log/control file/sp file for every backup stream.

In some embodiments, the method 10 further includes creating the reference file and the data file on dedupe storage. In some embodiments, the method 10 further includes creating the reference file and the data file corresponding to each backup stream of the plurality of backup streams on a backup server. The reference and data files may be used for deduplication in case of data loss and/or corruption on the local cache in the client database server.

The method 20, furthermore includes, at block 40, deduping subsequent backup streams based on the data files in the local cache. As each data file in the local cache has a unique file name assigned to it, the method is able to perform client-side deduplication of the data files and thus avoid prob calls and cogs on the backup server.

The systems and methods of client-side deduplication is further described with reference to an example wherein the RMAN backs up an Oracle datafile:/oracle/system01.dbf. In this example embodiment, the RMAN assigns the name 5hviff42_1_1 to the backup stream.

The block reader 132 reads the first block to identify the following:
BID: 2780121648
DBName: DB2CDB Further, the dictionary block reader 134 reads the file number (file #) and relative file number (relative file #) for a dictionary block. The file name generator 136 generates a unique inode number as given below:
Inode=file #<<32| relative_file #

Further, the file name generator 136r creates a unique file name for this file based on <DBName>-<DBID>-<file #<<32| relative file #>as:
db2cdb-2780121648-11673330238439292929

The file creator 140 creates two files on the local cache:
Reference file: Data/5hviff42_1_1
Data file: Data/db2cdb-2780121648-11673330238439-292929.data As mentioned earlier, the reference file (Data/5hviff42_1_1) is an empty file with extended metadata which points to the data file (Data/db2cdb-2780121648-116733-30238439292929.data), where data is written.

In the subsequent backup, even if RMAN gives a different name to the backup stream which contains the reference file, the file name for the data file remains the same. Thus, enabling client-side deduplication at the local cache even if the underlying data file is unchanged.

The systems and methods described herein may be partially or fully implemented by a special purpose computer system created by configuring a general-purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium, such that when run on a computing device, cause the computing device to perform any one of the aforementioned methods. The medium also includes, alone or in combination with the program instructions, data files, data structures, and the like. Non-limiting examples of the non-transitory computer-readable medium include, but are not limited to, rewriteable non-volatile memory devices (including, for example, flash memory devices, erasable programmable read-only memory devices, or a mask read-only memory devices), volatile memory devices (including, for example, static random access memory devices or a dynamic random access memory devices), magnetic storage media (including, for example, an analog or digital magnetic tape or a hard disk drive), and optical storage media (including, for example, a CD, a DVD, or a Blu-ray Disc). Examples of the media with a built-in rewriteable non-volatile memory, include but are not limited to memory cards, and media with a built-in ROM, including but not limited to ROM cassettes, etc. Program instructions include both machine codes, such as produced by a compiler, and higher-level codes that may be executed by the computer using an interpreter. The described hardware devices may be configured to execute one or more software modules to perform the operations of the above-described example embodiments of the description, or vice versa.

Non-limiting examples of computing devices include a processor, a controller, an arithmetic logic unit (ALU), a digital signal processor, a microcomputer, a field programmable array (FPA), a programmable logic unit (PLU), a microprocessor, or any device which may execute instructions and respond. A central processing unit may implement an operating system (OS) or one or more software applications running on the OS. Further, the processing unit may access, store, manipulate, process and generate data in response to the execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Figure 6:
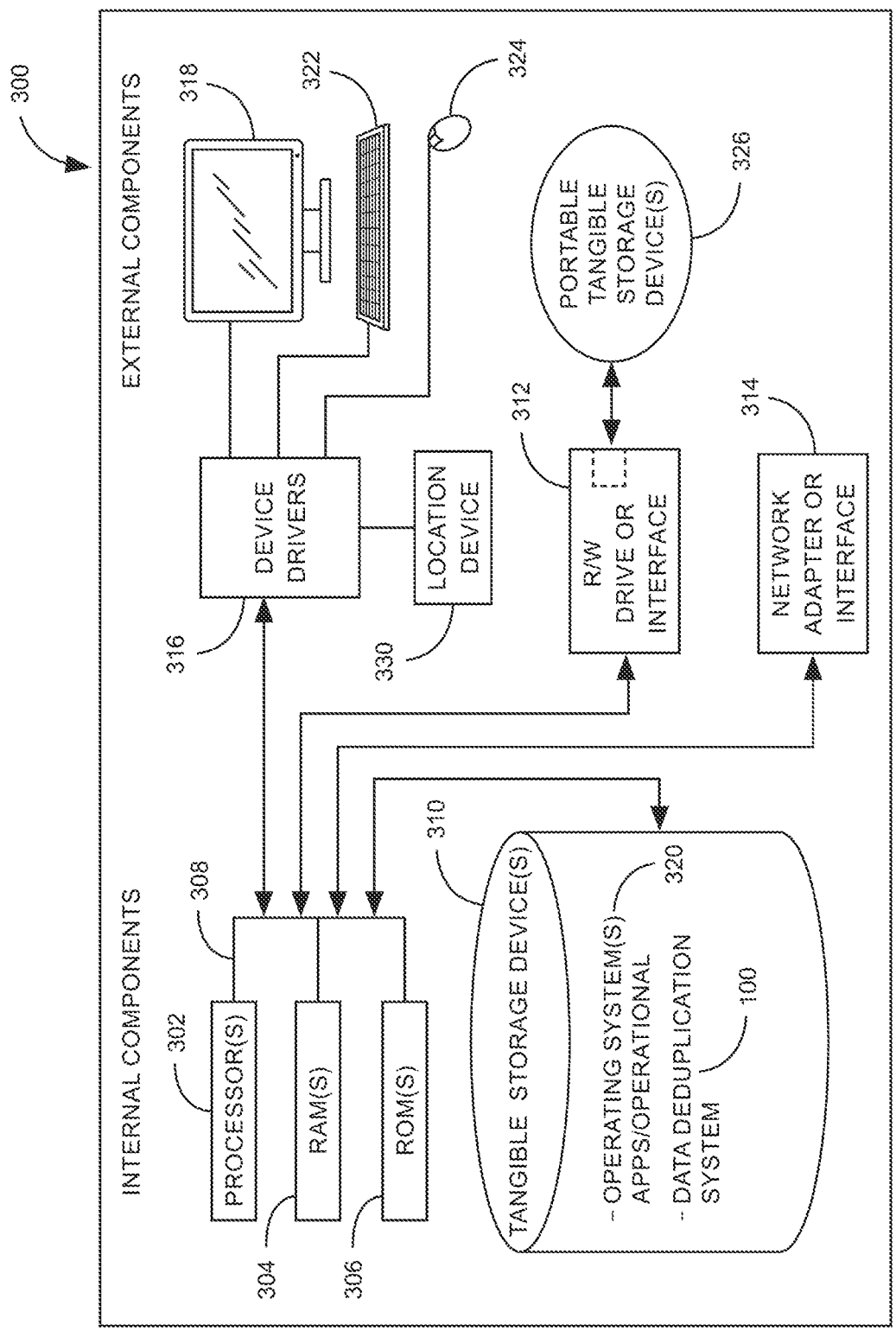
FIG. 6 is a block diagram illustrating an example computer system, according to some aspects of the present description.

One example of a computing system 300 is described below in FIG. 6. The computing system 300 includes one or more processor 302, one or more computer-readable RAMs 304 and one or more computer-readable ROMs 306 on one or more buses 308. Further, the computer system 308 includes a tangible storage device 310 that may be used to execute operating systems 320 and the data deduplication system 100. Both, the operating system 320 and data deduplication system 100 are executed by processor 302 via one or more respective RAMs 304 (which typically includes cache memory). The execution of the operating system 320 and/or the system 100 by the processor 302, configures the processor 302 as a special-purpose processor configured to carry out the functionalities of the operation system 320 and/or the data deduplication system 100, as described above. In some embodiments, the processor 302 is further configured to execute the one or more devices 120, the proxy pool 140, the storage nodes 160, or combinations thereof.

Examples of storage devices 310 include semiconductor storage devices such as ROM 506, EPROM, flash memory or any other computer-readable tangible storage device that may store a computer program and digital information.

Computer system 300 also includes a R/W drive or interface 312 to read from and write to one or more portable computer-readable tangible storage devices 326 such as a CD-ROM, DVD, memory stick or semiconductor storage device. Further, network adapters or interfaces 314 such as a TCP/IP adapter cards, wireless Wi-Fi interface cards, or 3G or 4G wireless interface cards or other wired or wireless communication links are also included in the computer system 300.

In one example embodiment, the data deduplication system 100 may be stored in tangible storage device 310 and may be downloaded from an external computer via a network (for example, the Internet, a local area network or another wide area network) and network adapter or interface 314.

Computer system 300 further includes device drivers 316 to interface with input and output devices. The input and output devices may include a computer display monitor 318, a keyboard 322, a keypad, a touch screen, a computer mouse 324, and/or some other suitable input device.

In this description, including the definitions mentioned earlier, the term 'module' may be replaced with the term 'circuit.' The term 'module' may refer to, be part of, or include processor hardware (shared, dedicated, or group) that executes code and memory hardware (shared, dedicated, or group) that stores code executed by the processor hardware. The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above. Shared memory hardware encompasses a single memory device that stores some or all code from multiple modules. Group memory hardware encompasses a memory device that, in combination with other memory devices, stores some or all code from one or more modules.

In some embodiments, the module may include one or more interface circuits. In some examples, the interface circuits may include wired or wireless interfaces that are connected to a local area network (LAN), the Internet, a wide area network (WAN), or combinations thereof. The functionality of any given module of the present description may be distributed among multiple modules that are connected via interface circuits. For example, multiple modules may allow load balancing. In a further example, a server (also known as remote, or cloud) module may accomplish some functionality on behalf of a client module.

While only certain features of several embodiments have been illustrated and described herein, many modifications and changes will occur to those skilled in the art. It is, therefore, to be understood that the appended claims are intended to cover all such modifications and changes as fall within the scope of the invention and the appended claims.

The invention claimed is:

1. A system comprising a first computer hardware and a second computer hardware, the first computer hardware having a memory storing one or more processor-executable routines and a processor communicatively coupled to the memory, the processor configured to execute the one or more processor-executable routines to:
   identify, for each of a plurality of backup streams, a set of metadata having a unique name;
   create, for each set of metadata, an empty data file having a file name that is based on the unique name of the set of metadata and upon an intention to perform a deduplication via a user device; and
   perform, based on a group of data files comprising one or more of the empty data files, the deduplication, wherein the group of data files is stored locally in a cache memory,
   the second computer hardware having a second memory storing one or more second processor-executable routines and a second processor communicatively coupled to the second memory, the second processor configured to execute the second one or more processor-executable routines to:
   determine, during a cataloging and for each set of metadata based on one or more data blocks in a respective backup stream, the unique name for the set of metadata; and
   back-up and recover the data blocks,
   wherein the second computer hardware is implemented at the user device.

2. The system of claim 1, wherein the unique name is further based on a database name, a database ID, and an inode number corresponding to the backup stream.

3. The first computer implemented system of claim 2, wherein the second computer hardware is configured to execute the second one or more processor-executable routines to:

read a first block of the backup stream to identify a stream block size, the database ID, and number of meta blocks in the backup stream;
read one or more subsequent blocks in the backup stream to identify a dictionary block, a file number, a relative file number, and the database name from the identified dictionary block;
generate the inode number based on the file number and the relative file number; and
generate the unique name file based on the database name, the database ID, and the inode number.

4. The system of claim 1, wherein a backup stream of the plurality of backup streams comprises a data file, an archived log file, a control file, and an sp file.

5. The system of claim 1, wherein the user device comprises a client database that is implemented as an Oracle database.

6. A client-side deduplication system for a plurality of backup streams generated by a backup and recovery client from a client database, comprising:
   a memory storing one or more processor-executable routines; and
   a processor communicatively coupled to the memory, the processor configured to execute the one or more processor-executable routines to:
      a second computer hardware having a second memory storing one or more second processor-executable routines and a second processor communicatively coupled to the second memory, the second processor configured to execute the second one or more processor-executable routines;
      identify, for each of a plurality of backup streams, a set of metadata having a unique name, wherein the unique name of the set of metadata is determined by the second computer hardware during a cataloging, wherein the unique name is based on one or more data blocks in the respective backup stream, and wherein the second computer hardware is configured to back-up and recover the data blocks;
      create, for each set of metadata, an empty data file having a file name that is based on the unique name of the set of metadata and upon an intention to perform a deduplication via a user device, wherein the second computer hardware is implemented at the user device; and
      perform, based on a group of data files comprising one or more of the empty data files, the deduplication, wherein the group of data files is stored locally in a cache memory.

7. The client-side deduplication system of claim 6, wherein the unique name is further based on a database name, a database ID, and an inode number corresponding to the backup stream.

8. The client-side deduplication system of claim 7, wherein the processor configured to execute the one or more processor-executable routines to:
   read a first block of the backup stream to identify a stream block size, the database ID, and number of meta blocks in the backup stream;
   read one or more subsequent blocks in the backup stream to identify a dictionary block, read a file number, a relative file number, and the database name from the identified dictionary block;
   generate the inode number based on the file number and the relative file number; and
   generate the unique name based on the database name, the database ID, and the inode number.

9. The client-side deduplication system of claim 6, wherein a backup stream of the plurality of backup streams comprises a data file, an archived log file, a control file, and an sp file.

10. A method for client-side deduplication of a plurality of backup streams generated by a backup and recovery client from a client database, the method comprising:
   identifying, for each of a plurality of backup streams, a set of metadata having a unique name, wherein the unique name of the set of metadata is determined by a second computer-implemented system during a cataloging, wherein the unique name is based on one or more data blocks in the respective backup stream, and wherein the second computer-implemented system is configured to back-up and recover the data blocks;
   creating, for each set of metadata, an empty data file having a file name that is based on the unique name of the set of metadata and upon an intention to perform a deduplication via a user device, wherein the second computer-based system is implemented at the user device; and
   perform, based on a group of data files comprising one or more of the empty data files, the deduplication, wherein the group of data files is stored locally in a cache memory.

11. The method of claim 10, wherein the unique name is further based on a database name, a database ID, and an inode number corresponding to the backup stream.

12. The method of claim 11, wherein the step of generating the unique file name comprises:
   reading a first block of the backup stream to identify a stream block size, the database ID, and number of meta blocks in the backup stream;
   reading one or more subsequent blocks in the backup stream to identify a dictionary block, reading a file number, a relative file number, and the database name from the identified dictionary block;
   generating the inode number based on the file number and the relative file number, and
   generating the unique name based on the database name, the database ID, and the inode number.

13. The method of claim 10, wherein a backup stream of the plurality of backup streams comprises a data file, an archived log file, a control file, and an sp file.

14. The method of claim 10, wherein the user device comprises a client database that is implemented as an Oracle database.

* * * * *